US007015804B2

(12) United States Patent
Okubo et al.

(10) Patent No.: US 7,015,804 B2
(45) Date of Patent: Mar. 21, 2006

(54) PRESSURE SENSOR, TRANSMITTER, AND TIRE CONDITION MONITORING APPARATUS

(75) Inventors: Youichi Okubo, Gifu-ken (JP); Kazunori Sawafuji, Gifu-ken (JP); Yoshitaka Ito, Gifu-ken (JP); Takashi Ibuka, Gifu-ken (JP); Hiroshi Ota, Aichi-ken (JP)

(73) Assignee: Pacific Industrial Co., Ltd., Ogaki (JP)

( * ) Notice: Subject to any disclaimer, the term of this patent is extended or adjusted under 35 U.S.C. 154(b) by 143 days.

(21) Appl. No.: 10/729,067

(22) Filed: Dec. 5, 2003

(65) Prior Publication Data

US 2004/0155785 A1    Aug. 12, 2004

(30) Foreign Application Priority Data

Feb. 12, 2003 (JP) .............................. 2003-033463
Apr. 23, 2003 (JP) .............................. 2003-118495

(51) Int. Cl.
*B60C 23/00* (2006.01)
(52) U.S. Cl. .................. 340/447; 340/442; 340/445
(58) Field of Classification Search ................ 340/442, 340/445, 447
See application file for complete search history.

(56) References Cited

U.S. PATENT DOCUMENTS

| 3,185,785 | A |   | 5/1965  | Howard Jr., et al. |
| 4,701,742 | A |   | 10/1987 | Ruehr |
| 5,040,562 | A |   | 8/1991  | Achterholt |
| 5,551,303 | A |   | 9/1996  | Donner et al. |
| 5,754,101 | A |   | 5/1998  | Tsunetomi et al. |
| 5,774,047 | A | * | 6/1998  | Hensel, IV ................ 340/442 |

FOREIGN PATENT DOCUMENTS

| EP | 0 020 809 A |   | 1/1981 |
| JP | 8-094468    |   | 4/1996 |
| JP | 8094468     | * | 4/1996 |

* cited by examiner

*Primary Examiner*—Julie Bichngoc Lieu
(74) *Attorney, Agent, or Firm*—Collin P. Cahoon; Carstens & Cahoon, LLP

(57) ABSTRACT

A pressure sensor has a diaphragm that is exposed to air in a tire of a vehicle. A transmitter wirelessly transmits data representing the air pressure of the tire. A casing accommodates the transmitter and the pressure sensor. A lid closes an opening of the casing. A metal body is provided on the lid. When the opening of the casing is closed with the lid, the diaphragm is covered with the metal body.

9 Claims, 4 Drawing Sheets

PRESSURE SENSOR, TRANSMITTER, AND TIRE CONDITION MONITORING APPARATUS

BACKGROUND OF THE INVENTION

The present invention relates to a pressure sensor, a transmitter unit that has the pressure sensor, and a tire condition monitoring apparatus that has the transmitter.

For example, Japanese Laid-Open Patent Publication No. 8-94468 discloses a structure of a pressure sensor unit, in which a pressure sensor is adhered to a lead terminal that also functions as a shielding member. The pressure sensor is three-dimensionally covered by the lead terminal. This structure prevents the pressure sensor from being affected by outside electromagnetic fields and thus allows the pressure sensor to accurately measure a pressure.

However, in the apparatus disclosed in the above publication, the pressure sensor is three-dimensionally covered with the lead terminal, which also functions as a shielding member. This increases the size of the pressure sensor unit, which includes the shielding member. In other words, the structure of the publication cannot reduce a size of a pressure sensor unit that includes a shielding member.

SUMMARY OF THE INVENTION

Accordingly, it is an objective of the present invention to provide a compact pressure sensor that accurately measures a pressure. The present invention also relates to a transmitter unit having such a pressure sensor and a tire condition monitoring apparatus having such a transmitter unit.

To achieve the foregoing and other objectives and in accordance with the purpose of the present invention, a pressure sensor having a diaphragm exposed to gas is provided. The diaphragm is covered with metal body that is spaced from the diaphragm. A predetermined voltage can be applied to the metal body.

The present invention also provides a transmitter unit having a pressure sensor, a transmitter, a casing, a lid, and a metal body is provided. The pressure sensor has a diaphragm exposed to air in a tire of a vehicle. The pressure sensor measures a pressure of the air in the tire. The transmitter wirelessly transmits data representing the air pressure measured by the pressure sensor. The casing accommodates the transmitter and the pressure sensor. The lid closes the opening of the casing. The metal body is provided on the lid. When the opening of the casing is closed with the lid, the diaphragm is covered with the metal body.

Further, the present invention provides a tire condition monitoring apparatus having a pressure sensor, a transmitter, a casing, a lid, a metal body, a reception antenna, and a receiver. The pressure sensor has a diaphragm exposed to air in a tire of a vehicle. The pressure sensor measures a pressure of the air in the tire. The transmitter wirelessly transmits data representing the air pressure measured by the pressure sensor. The casing accommodates the transmitter and the pressure sensor. The lid closes the opening of the casing. The metal body is provided on the lid. When the opening of the casing is closed with the lid, the diaphragm is covered wit the metal body. The reception antenna receives data transmitted by the transmitter. The receiver processes data received with the reception antenna.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A pressure sensor, transmitters, and a tire condition monitoring apparatus according to the present invention will now be described with reference to the drawings.

Figure 1:
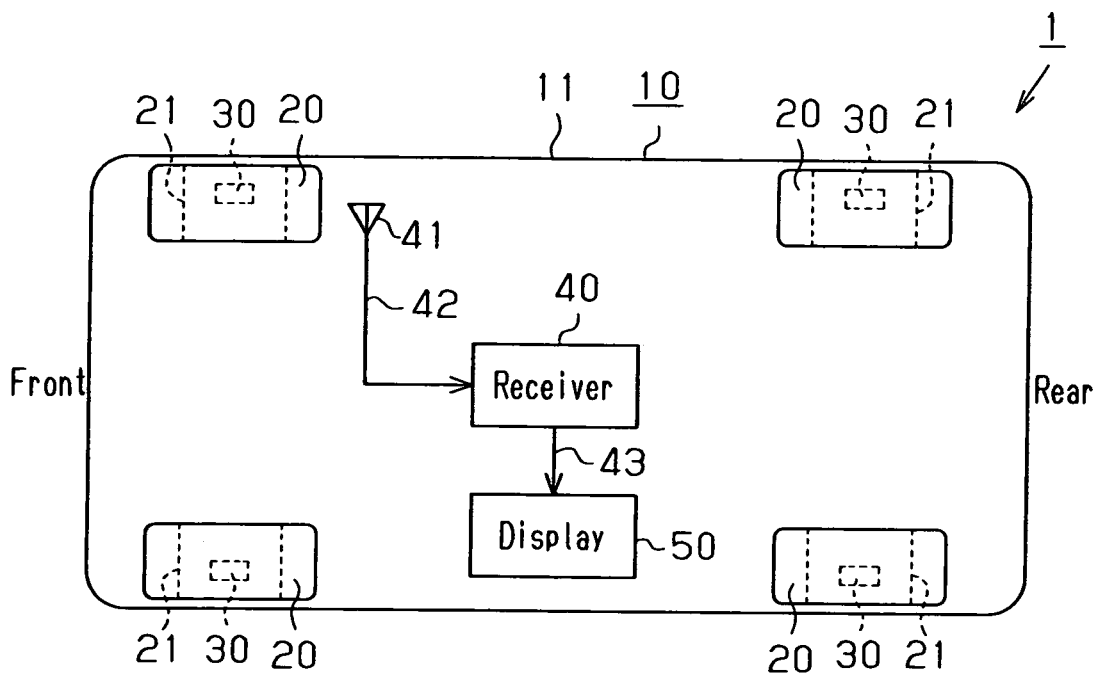
FIG. 1 is a block diagram showing a tire condition monitoring apparatus according to one embodiment of the present invention.

As shown in FIG. 1, the tire condition monitoring apparatus 1 includes four transmitters 30 and a receiver 40. Each transmitter 30 is located in one of the tires 20 of a vehicle 10. The receiver 40 is located on a body frame 11 of the vehicle 10.

Each transmitter 30 is located in the corresponding tire 20 and is fixed, for example, to a wheel 21 of the tire 20. Each transmitter 30 measures the condition of the corresponding tire 20, that is, the pressure of the tire 20. The transmitter 30 then wirelessly transmits data containing air pressure data.

The receiver 40 is located at a predetermined position on the body frame 11 and is activated by electricity of a battery (not shown) of the vehicle 10. The receiver 40 is connected to a reception antenna 41 with a cable 42. The receiver 40 receives data transmitted by the transmitters 30 through the reception antenna 41.

A display 50 is located in the view of the driver of the vehicle 10, for example, in the passenger compartment. The display 50 is connected to the receiver 40 with a cable 43.

Figure 2:
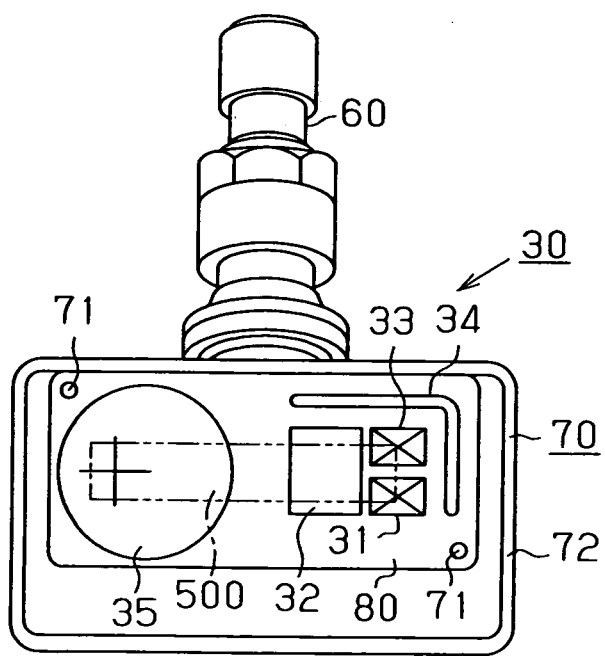
FIG. 2 is a diagrammatic view showing the structure of one of the transmitters shown in FIG. 1.

As shown in FIG. 2, each transmitter 30 is accommodated in a casing 70 that is located below a valve stem 60. Air is injected into the tire 20 through the valve stem 60. The casing 70 is formed into a substantially rectangular box. The casing 70 accommodates a substantially rectangular substrate 80. Electronic elements such as a transmission controller 31, a pressure sensor 32, a transmission circuit 33, a transmission antenna 34, and a battery 35 are mounted on the substrate 80. The substrate 80 is fixed to the bosses 71 that are integrally formed with the casing 70. The casing 70 has a through hole (not shown) to permit the pressure sensor 32 to measure the air pressure in the tire 20. The casing 70 has an opening 72, which is closed with a lid 73 for protecting the electronic elements.

Figure 3:
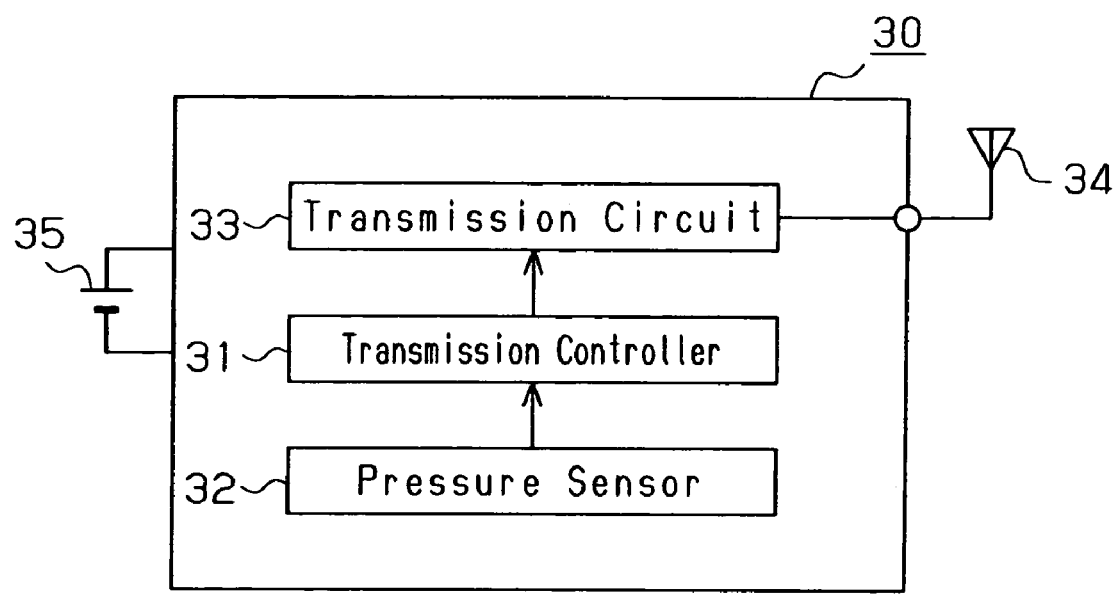
FIG. 3 is a block diagram showing one of the transmitters shown in FIG. 1.

As shown in FIG. 3, each transmitter 30 includes a transmission controller 31, which is a microcomputer. The transmission controller 31 includes, for example, a central processing unit (CPU), a read only memory (ROM), and a random access memory (RAM). A unique ID code is registered in an internal memory, for example, the ROM, of the transmission controller 31. The ID code is used to distinguish the associated transmitter 30 from the other three transmitters 30.

The pressure sensor 32 measures the air pressure in the interior of the associated tire 20 and provides the transmission controller 31 with pressure data, which is obtained from the measurement. The transmission controller 31 sends data containing the air pressure data and the registered ID code to a transmission circuit 33. The transmission circuit 33 encodes and modulates the data sent from the transmission controller 31. The transmission circuit 33 then wirelessly transmits the data through a transmission antenna 34. Each transmitter 30 is provided with a battery 35. The transmission circuit 33 and the battery 35 function as a power supply circuit that supplies electricity to the transmitter 30. The transmitter 30 is driven by electricity of the battery 35.

Figure 4:
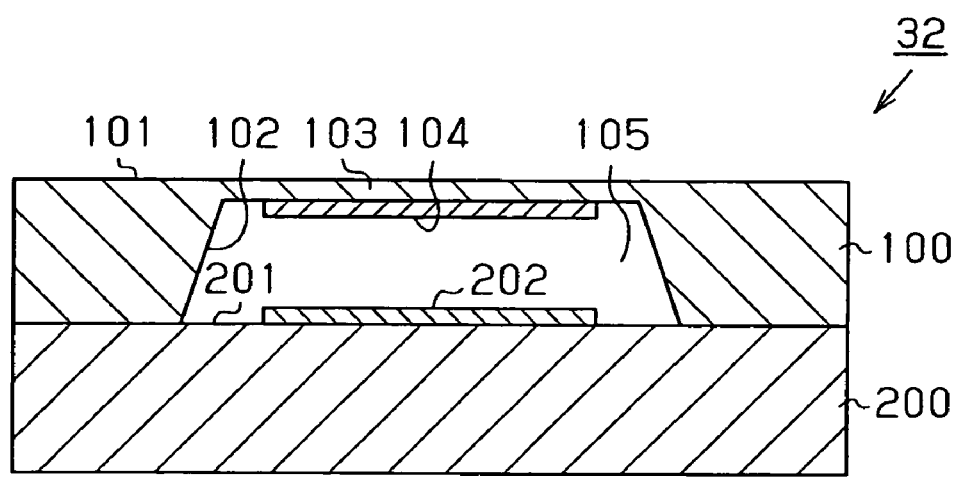
FIG. 4 is a schematic cross-sectional view showing the pressure sensor shown in FIG. 3.

As shown in FIG. 4, the pressure senor 32 is made of ceramic, and has an upper base 100 and a lower base 200. A frustoconical recess 102 is formed in a central portion of the upper base 100. As a result, a diaphragm 103 is formed in an central portion of a upper surface 101 of the upper base 100. A first electrode 104 is formed on the lower surface of the diaphragm 103.

A second electrode 202 is formed in a center of the upper surface 201 of the lower base 200. The first electrode 104 and the second electrode 202 are formed by aluminum deposition. The upper base 100 and the lower base 200 are hermitically attached to each other such that the first electrode 104 and the second electrode 202 face each other. As a result, a hermetic space 105 is defined between the first electrode 104 and the second electrode 202. The hermetic space 105 is filled with gas having a predetermined pressure.

The diaphragm 103 is exposed to the air inside the tire 20 through the through hole (not shown) formed in the casing 70. In other words, the diaphragm 103 is exposed to air, which is a measured gas. Therefore, when the air pressure in the tire 20 changes, the difference between the air pressure in the tire 20 and the pressure of the gas filling the hermetic space 105 is changed. Accordingly, the diaphragm 103 is flexed. Then, the distance between the first electrode 104 and the second electrode 202 is changed, which changes a capacitance between the first electrode 104 and the second electrode 202, accordingly. Therefore, the air pressure in the tire 20 is measured based on the capacitance between the first electrode 104 and the second electrode 202. That is, the pressure sensor 32 is a capacitance type pressure sensor.

Figure 5:
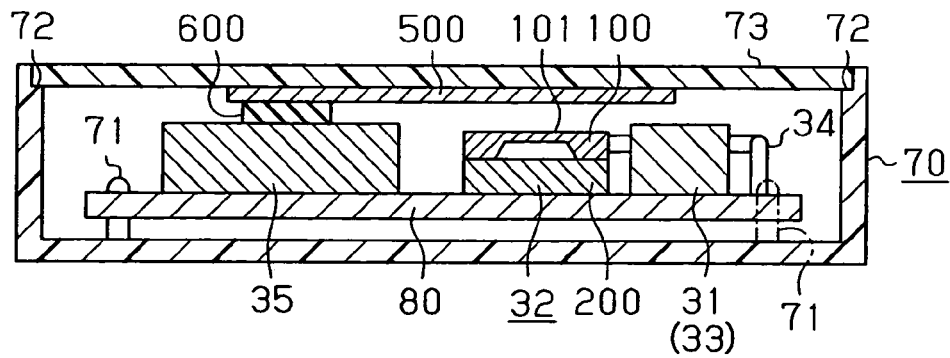
FIG. 5 is a cross-sectional view showing the transmitter shown in FIG. 3.

As shown in FIG. 5, a metal body 500 shaped as a plate is provided on a lid 73 to close the opening 72 of the casing 70. That is, the metal body 500 is spaced apart from the upper surface 101 of the upper base 100, or the diaphragm 103. In this state, the metal body 500 is provided on the inner side of the lid 73 such that the metal body 500 spreads over the diaphragm 103. The metal body 500 preferably covers 50 to 70% of the upper surface 101 of the upper base 100. If the metal body 500 covers the entire upper surface 101 of the pressure sensor 32, the metal body 500 functions as a shield. As a result, the pressure sensor 32 is scarcely affected by outside electromagnetic fields. If the metal body 500 does not cover the upper surface 101 of the pressure sensor 32, the metal body 500 does not function as a shield. In this case, although the metal body 500 does not attenuate the radio field intensity of signals transmitted by the transmission antennas 34, the pressure sensor 32 is vulnerable to influences of outside electromagnetic fields.

A conductive rubber piece 600 is located between the metal body 500 and the battery 35, which functions as a power supply. When the opening 72 of the casing 70 is closed with the lid 73, the conductive rubber piece 600 connects the metal body 500 with the battery 35. Therefore, the conductive rubber piece 600 permits the metal body 500 covering the upper surface 101 of the pressure sensor 32 to be maintained at the same potential as the power supply potential Vdd (+3V) of the battery 35. Therefore, pressure sensor 32 is shielded by the metal body 500. That is, the metal body 500 shields the pressure sensor 32 against outside electromagnetic fields.

A transmitter unit includes the pressure sensor 32, the transmitter 30, the casing 70, the lid 73, and the metal body 500.

This embodiment has the following advantages.

(1) The metal body 500 is provided on the inner side of the lid 73 closing the opening 72 of the casing 70. The conductive rubber piece 600 is located between the metal body 500 and the battery 35. Therefore, the conductive rubber piece 600 permits the metal body 500 overlapping the upper surface 101 of the pressure sensor 32 to be maintained at the same potential as the power supply potential Vdd (+3V) of the battery 35. As a result, the pressure sensor 32 is shielded with the metal body 500.

That is, this structure prevents the pressure sensor 32 from being affected by outside electromagnetic fields and thus allows the pressure sensor 32 to accurately measure the air pressure in the tire 20. Unlike the structure disclosed in Japanese Laid-Open Patent Publication No. 8-94468, where the pressure sensor is three-dimensionally covered with a lead terminal that also functions as a shielding member, the pressure sensor 32 is covered with the metal body 500 on the lid 73. Therefore, the size of the pressure sensor 32 is reduced.

(2) Since the size of the pressure sensor 32 is reduced, the size of the transmitter 30 is reduced. Therefore, when attaching the tire 20 to the wheel 21, the bead is prevented from contacting the casing 70, which accommodates the transmitter 30. In other words, when attaching the tire 20 to the wheel 21, the casing 70 and the transmitter 30 are prevented from being damaged by the bead of the tire 20.

(3) The pressure sensor 32 is scarcely affected by outside electromagnetic fields. This permits the pressure sensor 32 to accurately measure even small changes in the air pressure in the tire 20. In other words, the present invention provides the transmitter 30, which accurately measures the air pressure in the tire 20. As a result, the transmitter 30 wirelessly transmits accurate air pressure data to the receiver 40.

(4) Shielding of the pressure sensor 23 is achieved only by closing the opening 72 of the casing 70 with the lid 73 on which the metal body 500 is provided. Compared to a conventional assembly procedure, only a step for attaching the metal body 500 to the lid 73 is added. In other words, no complicated step is added to the procedure for obtaining the shielding effect. Therefore, the transmitter 30 is easily assembled with the casing 70.

(5) The receiver 40 receives data through the reception antenna 41 and, based on the received data, causes the display 50 to display air pressure data. This informs a driver of the vehicle 10 of the accurate air pressure data. In other words, the present invention provides the tire condition monitoring apparatus 1, which accurately measures the air pressure in the tire 20.

It should be apparent to those skilled in the art that the present invention may be embodied in many other specific forms without departing from the spirit or scope of the invention. Particularly, it should be understood that the invention may be embodied in the following forms.

A conductive film may be formed on the upper surface 101 of the upper base 100 of the pressure sensor 32 by aluminum deposition, and the formed conductive film may be connected to the battery 35 with the metal body 500 and the conductive rubber piece 600. This structure permits the conductive film formed on the upper surface 101 of the upper base 100 to be maintained at the same potential as the potential of the battery 35. Therefore, pressure sensor 32 is shielded by the metal body 500. That is, the metal body 500 shields the pressure sensor 32 against outside electromagnetic fields.

Figure 6:
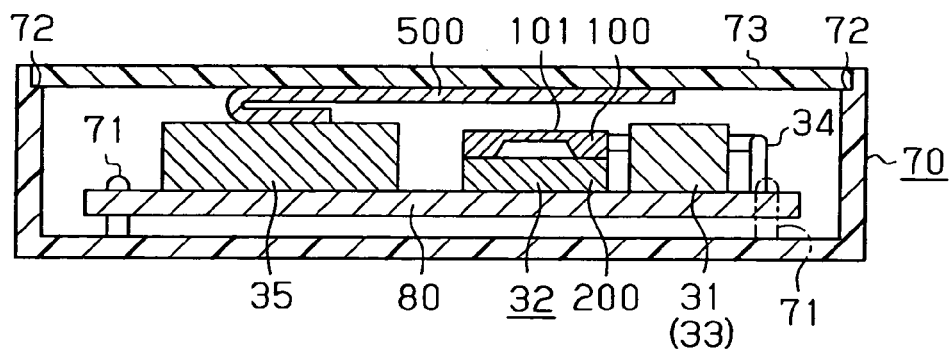
FIG. 6 is a cross-sectional view showing a transmitter according to another embodiment.

As shown in FIG. 6, a left end of the metal body 500 may be bent such that the left end contacts the battery 35 when the opening 72 of the casing 70 is closed with the lid 73 to shield the pressure sensor 32 with the metal body 500. This structure permits the metal body 500 to be at the same potential as the potential of the battery 35 so that the metal body 500 shields the pressure sensor 32 against outside electromagnetic fields.

Figure 7:
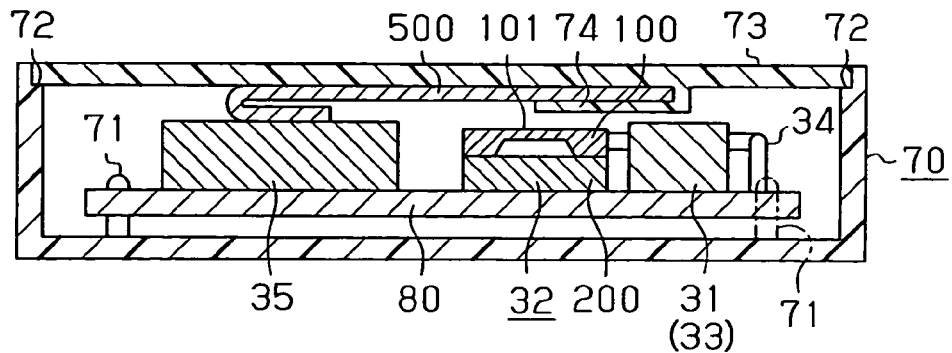
FIG. 7 is a cross-sectional view showing a transmitter according to another embodiment.

As shown in FIG. 7, a left end of the metal body 500 may be bent such that the bent end contacts the battery 35 when the opening 72 of the casing 70 is closed, and an engaging portion 74 for receiving a right end of the metal body 500 may be formed on the lid 73. The right end of the metal body 500 is engaged with the engaging portion 74 so that the metal body 500 shields the pressure sensor 32. This structure permits the metal body 500 to be at the same potential as the potential of the battery 35 so that the metal body 500 shields the pressure sensor 32 against outside electromagnetic fields.

Figure 8:
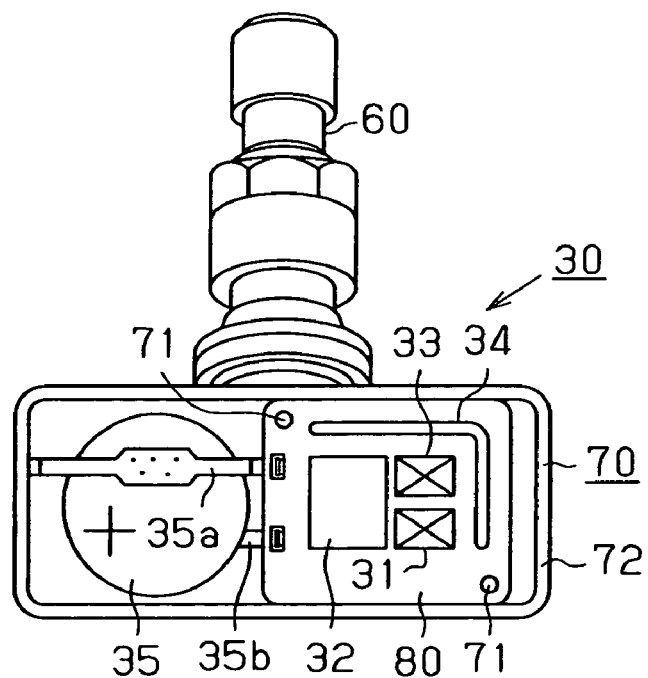
FIG. 8 is a diagrammatic view showing the structure of a transmitter according to another embodiment.
Figure 9:
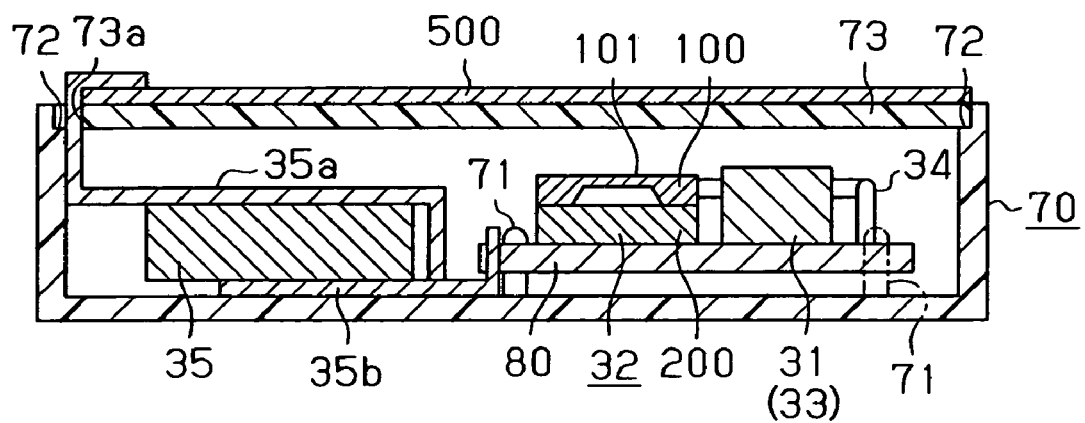
FIG. 9 is a cross-sectional view showing a transmitter according to another embodiment.

In an embodiment shown FIGS. 8 and 9, the battery 35 is accommodated in a left section of the casing 70. The substantially rectangular substrate 80 is accommodated in a right section of the casing 70. Electronic elements such as the transmission controller 31, the pressure sensor 32, the transmission circuit 33, and the transmission antenna 34 are mounted on the substrate 80. The substrate 80 is fixed to the bosses 71 that are integrally formed with the casing 70. The casing 70 has a through hole (not shown) to permit the pressure sensor 32 to measure the air pressure in the tire 20. The casing 70 has an opening 72, which is closed with a lid 73 for protecting the electronic elements.

The outer side of the lid 73 is covered with the metal body 500. Specifically, an aluminum film is transferred to the outer surface of the lid 73. A through hole 73a is formed in the lid 73. A positive terminal 35a is connected to the power supply potential Vdd (+3V) of the battery 35. An end portion of the positive terminal 35a extends through the through hole 73a and is bent toward the center of the lid 73. The bent end of the positive terminal 35a is connected with the metal body 500 through, for example, spot welding or soft soldering. The other end of the positive terminal 35a is not bent and is connected with the substrate 80 through, for example, soft soldering. A negative terminal 35b is connected to the ground potential GND (0V) of the battery 35. An end of the negative terminal 35b is bent and connected to the substrate with, for example, soft soldering.

This structure permits the metal body 500 to be at the same potential as the power supply potential Vdd (+3V) of the battery 35 so that the metal body 500 shields the pressure sensor 32 against outside electromagnetic fields. That is, this structure prevents the pressure sensor 32 from being affected by outside electromagnetic fields and thus allows the pressure sensor 32 to accurately measure the air pressure in the tire 20.

The metal body 500 may have a mesh structure. In this case, radio waves of a particular frequency can be blocked by the metal body 500 according to the size of the openings of the mesh.

In the illustrated embodiments FIGS. 1 and 7, the potential of the metal body 500 is the same as the power supply potential Vdd (+3V) of the battery 35. However, the potential of the metal body 500 may be the same as the ground potential GND (0V) of the battery 35. This structure also shields the pressure sensor 32 against outside electromagnetic fields with the metal body 500.

In all of the above embodiments, the potential of the metal body 500 is the same as the potential of the battery 35. However, the metal body 500 may be simply provided on the lid 73 without setting the potential of the metal body 500 equal to the potential of the battery 35.

As long as the metal body 500 has conductivity, the metal body 500 may be a conductive film.

The conductive rubber piece 600 may be replaced by a conductive adhesive. A conductive adhesive is capable of maintaining the potential of the metal body 500 to the same potential as the battery 35.

Therefore, the present examples and embodiments are to be considered as illustrative and not restrictive and the invention is not to be limited to the details given herein, but may be modified within the scope and equivalence of the appended claims.

The invention claim is:

1. A transmitter unit comprising:
   a pressure sensor having a diaphragm exposed to air in a tire of a vehicle, wherein the pressure sensor measures a pressure of the air in the tire;
   a transmitter that wirelessly transmits data representing the air pressure measured by the pressure sensor;
   a casing accommodating the transmitter and the pressure sensor;
   a lid for closing the opening of the casing;
   a metal body provided on the lid;
   wherein, when the opening of the casing is closed with the lid, the diaphragm is covered with the metal body; and
   a power supply circuit for supplying electricity to the transmitter, wherein when the opening of the casing is closed with the lid, the potential of the metal body is maintained at the same potential as the power supply circuit.

2. The transmitter unit according to claim 1, wherein the lid has an engaging portion to which the metal body is engaged.

3. The transmitter unit according to claim 1, wherein the power supply circuit comprises a battery, and wherein, when the opening of the casing is closed with the lid, the metal body contacts the battery.

4. The transmitter unit according to claim 3, further comprising conductive material for connecting the metal body with the battery.

5. A tire condition monitoring apparatus, comprising:
   a pressure sensor having a diaphragm exposed to air in a tire of a vehicle, wherein the pressure sensor measures a pressure of the air in the tire;
   a transmitter that wirelessly transmits data representing the air pressured measured by the pressure sensor;
   a casing accommodating the transmitter and the pressure sensor;
   a lid for closing the opening of the casing:
   a metal body provided on the lid, wherein, when the opening of the casing is closed with the lid, the diaphragm is covered with the metal body;
   a reception antenna for receiving data transmitted by the transmitter;
   a receiver for processing data received with the reception antenna; and
   a power supply circuit for supplying electricity to the transmitter, wherein, when the opening of the casing is closed with the lid, the potential of the metal body is maintained at the same potential as the power supply circuit.

6. The tire condition monitoring apparatus according to claim 5, wherein the lid has an engaging portion to which the metal body is engaged.

7. The tire condition monitoring apparatus according to claim 5, wherein the power supply circuit comprises a battery, and wherein, when the opening of the casing is closed with the lid, the metal body contacts the battery.

8. The tire condition monitoring apparatus according to claim 7, further comprising conduct live material for connecting the metal body with the battery.

9. The tire condition monitoring apparatus according to claim 8, wherein the conductive material is rubber.

* * * * *